(12) United States Patent
Homan et al.

(10) Patent No.: US 11,073,013 B2
(45) Date of Patent: Jul. 27, 2021

(54) ELECTRIC DIPOLE SURFACE ANTENNA CONFIGURATIONS FOR ELECTROMAGNETIC WELLBORE INSTRUMENT TELEMETRY

(71) Applicant: Schlumberger Technology Corporation, Sugar Land, TX (US)

(72) Inventors: Dean M. Homan, Sugar Land, TX (US); Jon Brunetti, Katy, TX (US); David L. Smith, Broomfield, CO (US); Erwann Lemenager, Calgary (CA)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 303 days.

(21) Appl. No.: 15/536,400

(22) PCT Filed: Dec. 17, 2015

(86) PCT No.: PCT/US2015/066496
§ 371 (c)(1),
(2) Date: Jun. 15, 2017

(87) PCT Pub. No.: WO2016/100736
PCT Pub. Date: Jun. 23, 2016

(65) Prior Publication Data
US 2017/0362931 A1 Dec. 21, 2017

Related U.S. Application Data (60) Provisional application No. 62/093,910, filed on Dec. 18, 2014.

(51) Int. Cl.
*E21B 47/13* (2012.01)
*G01V 3/20* (2006.01)
(Continued)

(52) U.S. Cl.
CPC ............ *E21B 47/13* (2020.05); *E21B 17/023* (2013.01); *G01V 3/20* (2013.01); *G01V 3/26* (2013.01); *G01V 11/002* (2013.01); *H01Q 1/04* (2013.01)

(58) Field of Classification Search
CPC ...... E21B 47/12; E21B 47/122; E21B 17/023; H01Q 1/04; G01V 11/002; G01V 3/20;
(Continued)

(56) References Cited

U.S. PATENT DOCUMENTS

| 4,523,148 A | 6/1985 | Maciejewski |
| 4,739,325 A * | 4/1988 | MacLeod .............. E21B 17/003 324/342 |

(Continued)

OTHER PUBLICATIONS

International Preliminary Report on Patentability issued in International Application PCT/US2015/066496 dated Jun. 20, 2017. 14 pages.

(Continued)

*Primary Examiner* — David M Schindler (57) ABSTRACT

An apparatus for detecting an electromagnetic signal originating in a wellbore includes an antenna comprising a pair of spaced apart electrodes in the ground spaced apart by a first distance having a midpoint at a second distance from the wellbore. The system includes at least one of a shielded electrical cable connecting each electrode to an input of a detector circuit, wherein the shielding is connected to produce common mode noise rejection; b) a second spaced apart electrode pair antenna spaced apart by one half the first distance and having a midpoint spaced $\sqrt{2}/2$ times the second distance from the surface of the wellbore, c) a second electrode pair antenna having a common midpoint with and being orthogonal to the at least one electric dipole antenna; and d) wherein the at least one electric dipole antenna is (Continued)

disposed in a second wellbore, the second wellbore having substantially no electrically conductive pipe therein.

12 Claims, 5 Drawing Sheets

(51) Int. Cl.
    *G01V 11/00*          (2006.01)
    *H01Q 1/04*           (2006.01)
    *E21B 17/02*          (2006.01)
    *G01V 3/26*           (2006.01)

(58) Field of Classification Search
    CPC ... G01V 3/26; G01V 3/02; G01V 3/04; G01V 3/06; G01V 3/22; G01V 3/24
    See application file for complete search history.

(56) References Cited

U.S. PATENT DOCUMENTS

| | | | | |
|---|---|---|---|---|
| 5,359,324 | A * | 10/1994 | Clark | E21B 17/1078 |
| | | | | 324/333 |
| 5,883,516 | A | 3/1999 | Van Steenwyk et al. | |
| 7,145,473 | B2 | 12/2006 | Wisler et al. | |
| 2004/0222901 | A1 * | 11/2004 | Dodge | E21B 47/12 |
| | | | | 340/854.3 |
| 2005/0133262 | A1 * | 6/2005 | Chen | G01V 3/24 |
| | | | | 175/40 |
| 2005/0167098 | A1 | 8/2005 | Lovell et al. | |
| 2010/0017156 | A1 | 1/2010 | Ziolkowski et al. | |
| 2011/0017512 | A1 * | 1/2011 | Codazzi | E21B 47/122 |
| | | | | 175/40 |
| 2011/0168446 | A1 * | 7/2011 | Lemenager | E21B 47/12 |
| | | | | 175/50 |
| 2014/0292592 | A1 * | 10/2014 | Gosling | B63G 8/001 |
| | | | | 343/709 |
| 2016/0356911 | A1 * | 12/2016 | Wilson | G01N 27/221 |

OTHER PUBLICATIONS

International Search Report and Written Opinion issued in International Application PCT/US2015/066496 dated Mar. 7, 2016. 18 pages.

\* cited by examiner

ELECTRIC DIPOLE SURFACE ANTENNA CONFIGURATIONS FOR ELECTROMAGNETIC WELLBORE INSTRUMENT TELEMETRY

CROSS REFERENCE TO RELATED APPLICATIONS

The present application claims the benefit of, and priority to, U.S. Provisional Patent Application No. 62/093,910, filed Dec. 18, 2014, which is hereby incorporated by reference in its entirety.

BACKGROUND

This disclosure is related to the field of electromagnetic telemetry used to communicate signals from instruments disposed in a wellbore to the Earth's surface. More particularly, the disclosure relates to antenna configurations used to detect electromagnetic telemetry signals emitted by such instruments.

U.S. Patent Application Publication No. 2011/0168446A1 and U.S. Pat. No. 7,145,473 B2 describe examples of electromagnetic telemetry for communicating signals between equipment disposed at the Earth's surface and LWD and/or MWD instruments in a wellbore. One type of electromagnetic telemetry known in the art includes a an electric dipole antenna formed by an insulated gap between conductive segments on a drill collar associated with the MWD and/or LWD instruments, or by a toroid disposed on the outer surface of the collar. A time varying voltage impressed across the insulated gap (or the toroid) generates an electromagnetic field which can be used to communicate between a surface electric dipole receiver antenna or a plurality of differently oriented electric dipole antennas and the MWD/LWD instrument. See the basic concept shown in FIG. 1. A surface transceiving sensor, i.e., a dipole antenna, may be composed of an electrode placed in the ground a selected distance from a drilling unit or "rig" and the well casing. The voltage between the electrode and the well casing is measured and signals from the MWD and/or LWD instruments encoded into the transmitted electromagnetic field are decoded from the measured voltages. Conversely, voltage imparted across the casing and electrode may induce an electromagnetic field in the subsurface that is detectable by the dipole antenna or toroid on the MWD/LWD instrument and internally decoded. The foregoing signal communication from wellbore to surface may be referred to as "uplink" communication and the surface to wellbore communication may be referred to as "downlink" communication.

Figure 1:
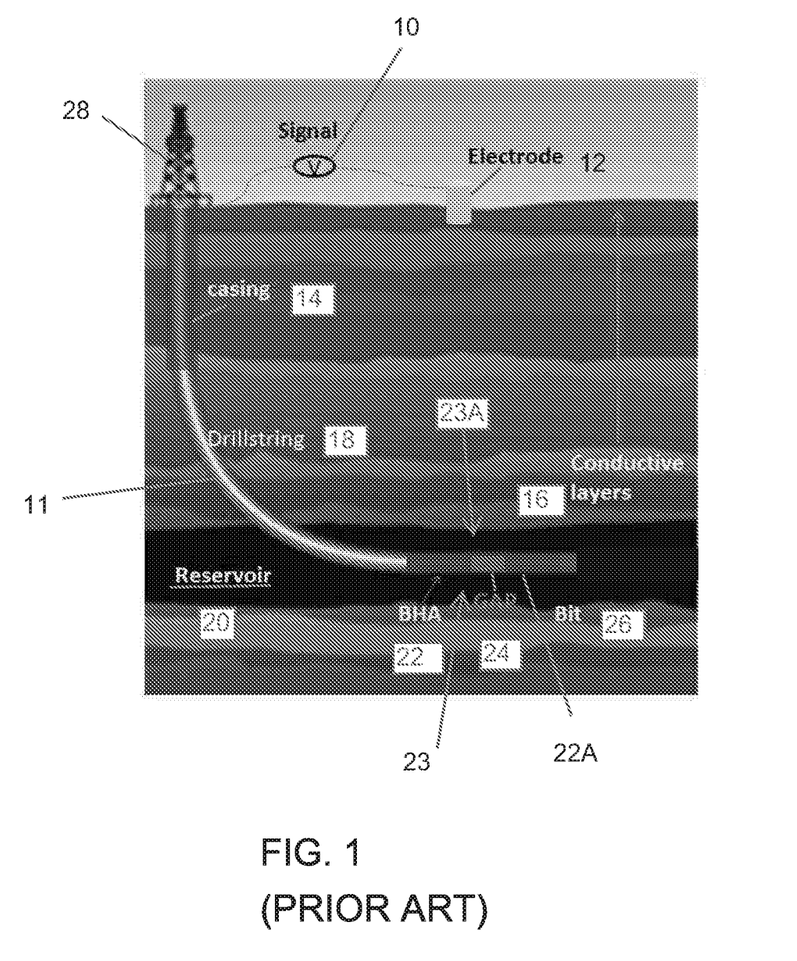
FIG. 1 shows an example electromagnetic telemetry system known in the art prior to the present disclosure.

Referring to FIG. 1, an electromagnetic telemetry system known in the art is shown to explain the basic components thereof. U.S. Patent Application Publication No. 2011/0168446A1 and U.S. Pat. No. 7,145,473B2 referred to above describe adaptations of the system shown in FIG. 1 and may be referred to for more details. A drilling unit or "rig" is shown generally at 28 and has equipment (not shown separately) to raise, lower and rotate a drill string 18 with a bottom hole assembly (BHA) 23 at its lower end. A drill bit 26 is disposed at the longitudinal end of the BHA 23 and is rotated, either by the drilling unit 28 and/or a motor (not shown) in the drill string 18 to axially extend the length of a wellbore 11. When the wellbore 11 is initialed drilled to a selected depth, a casing 14 may be inserted into the wellbore 11 and cemented in place. Drilling may then resume. The BHA 23 may include an MWD and/or LWD instrument, shown generally at 23A. The MWD/LWD instrument may be any type known in the art and may include sensors (not show separately) for measuring orientation of the BHA 23, as well as sensors for measuring shock and vibration of the BHA 23, and/or sensors for measuring one or more physical parameters of the formations (including conductive layers 16 and a reservoir formation 20) through which the instrument 23A passes during drilling and any subsequent movement within or along the wellbore 11. Such physical parameters may be of any kind known in the art, and may include, without limitation, electrical resistivity, acoustic velocity, natural gamma radiation, spectrally analyzed natural gamma radiation, density, neutron porosity and/or capture cross section, and nuclear magnetic resonance relaxation times. The foregoing are only examples and in no way are intended to limit the scope of the present disclosure.

In the present example circuitry (not shown) in the instrument 23A may be used to impart a time varying voltage across an insulating gap 24 disposed between conductive components 22, 22A of the instrument 23A. The circuitry (not shown) in the instrument 23A may include devices to encode measurements from the various sensors (not shown) in the instrument into the time varying voltage. The imparted voltage generates a time varying electromagnetic field in the formations 20, 16 which includes the encoded measurement data. In the present example, a voltage induced between an electrode 12 inserted into the ground at a selected distance from the drilling rig 28 and the casing 14 may be measured and decoded into data encoded into the time varying voltage by a surface measurement and decoding system, shown generally at 10 and which may be of any type known in the art.

Electrical noise may be induced in any device used to detect the electromagnetic telemetry signal. Sources of such electrical noise may include surface-induced low frequency noise. Such noise may be induced by poor grounding of drilling rig power generators and low frequency vibration of the steel drilling rig structure in the presence of the Earth's magnetic field, among other sources.

SUMMARY

An apparatus according to one aspect of the disclosure for detecting an electromagnetic signal originating in a wellbore includes an electric dipole antenna. The electric dipole antenna may include a pair of spaced apart electrodes in the ground spaced apart by a first distance and having a point between the electrodes at a second distance from the surface of the wellbore. The system includes at least one of: a) a shielded electrical cable connecting each electrode to an input of a detector circuit, wherein the shielding is connected to produce common mode noise rejection; b) a second spaced apart electrode pair antenna spaced apart by one half the first distance and having a midpoint spaced $\sqrt{2}/2$ times the second distance from the surface of the wellbore a connected in inverse polarity to the at least one antenna; c) a second electrode pair antenna having a common point with and being orthogonal to the at least one electric dipole antenna and electrically connected thereto; and d) wherein the at least one electric dipole antenna is disposed in a second wellbore, the second wellbore having substantially no electrically conductive pipe therein. The apparatus may also include a voltage measuring circuit connected to an input of the at least one electric dipole antenna.

A method for detecting an electromagnetic signal originating in a wellbore according to another aspect includes measuring a voltage induced by the electromagnetic field in at least one electric dipole antenna. The electric dipole antenna may include a pair of electrodes spaced apart by a first distance and spaced at a midpoint therebetween from a surface of the wellbore by a second distance. A method according to this aspect further includes at least one of: a) a shielded electrical cable connects each electrode to an input of a detector circuit, wherein the shielding is connected to produce common mode noise rejection; b) a second spaced apart electrode pair antenna spaced apart by one half the first distance and having a midpoint spaced √2/2 times the second distance from the surface of the wellbore is connected to the at least one electric dipole antenna in inverse polarity, c) a second electrode pair antenna having a common midpoint with and being orthogonal to the at least one electric dipole antenna is connected therewith; and d) wherein the at least one electric dipole antenna is disposed in a second wellbore, the second wellbore having substantially no electrically conductive pipe therein.

Other aspects and advantages will be apparent from the description and claims that follow.

DETAILED DESCRIPTION

Figure 2:
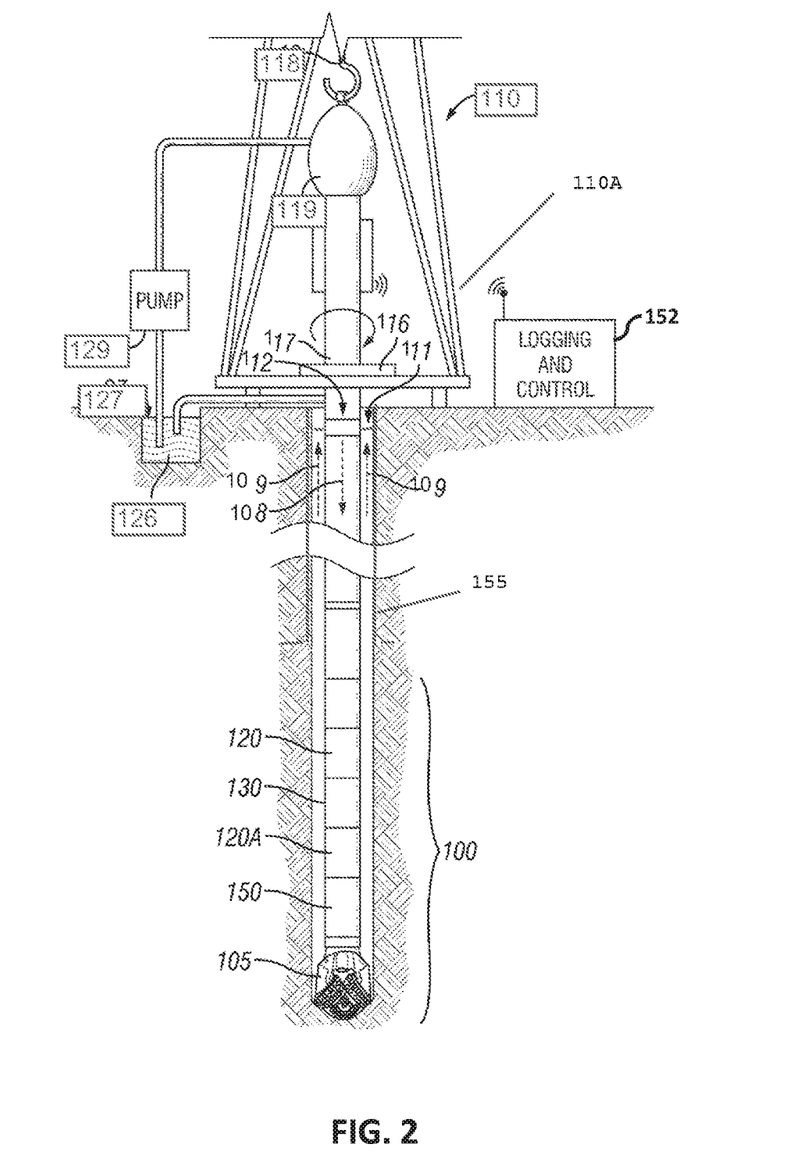
FIG. 2 shows one example embodiment of a drilling, measurement and telemetry system.

FIG. 2 shows an example embodiment of a drilling and measurement system that may be used in various embodiments according to the present disclosure. The system 110 shown in FIG. 2 may be deployed in either onshore or offshore applications. In a system 110 as shown in FIG. 2, a wellbore 111 may be formed in subsurface formations by rotary drilling in a manner that is well known in the art. Although the wellbore 111 in FIG. 2 is shown as being drilled substantially straight and vertically, the wellbore 111 may be directionally drilled, including having a substantially horizontal section, with equal effect as a substantially vertical wellbore.

A drill string 112 is suspended within the wellbore 111 and may have a bottom hole assembly (BHA) 100 which includes a drill bit 105 at its lower end. The system 110 includes a platform and derrick assembly 110A positioned over the wellbore 111. The platform and derrick assembly 110A includes a rotary table 116, a kelly 117, a hook 118 and a rotary swivel 119. In a drilling operation, the drill string 112 may be rotated by the rotary table 116 (energized by means not shown), which engages the kelly 117 at the upper end of the drill string 112. The kelly 117 is suspended from the hook 118. The hook 118 may be attached to a traveling block (not shown), through the kelly 117 and the rotary swivel 119 which permits rotation of the kelly 117 and thereby the drill string 112 relative to the hook 118. As is well known, a top drive system could be used in other embodiments with equal effect substituting the kelly 117, rotary table 116 and swivel 119. Accordingly, the scope of the disclosure is not limited to using a platform and derrick assembly 110A that has a kelly, rotary table and swivel.

Drilling fluid or mud 126 may be stored in a pit 127 formed at the well site (or on a drilling platform in marine drilling). A pump 129 moves the drilling mud 126 from the tank or pit 127 to the interior of the drill string 112 via a port in the swivel 119, which causes the drilling fluid 126 to flow downwardly through the drill string 112, as indicated by directional arrow 108. The drilling mud 126 exits the drill string 112 via ports (not shown) in the drill bit 105, and then circulates upwardly through an annular space region between the outside of the drill string 112 and the wall of the wellbore 111, as indicated by directional arrows 109. In this known manner, the drilling mud 126 lubricates and cools the drill bit 105 and carries formation cuttings up to the surface as it is returned (after removal of entrained drill cuttings and other contaminants) to the pit 127 for recirculation.

The BHA 100 is shown as having one MWD module 130 and one or more LWD modules 120 with reference number 120A depicting an electromagnetic signal transmitter. As used herein, the term "module" as applied to the MWD and LWD devices is understood to mean either a single measuring instrument or multiple measuring instruments contained in a single modular device, or multiple modular devices. Additionally, the BHA 100 may include a rotary steerable directional drilling system (RSS) and motor 150 or a steerable drilling motor.

The LWD module(s) 120 may be housed in a drill collar and can include one or more types of well logging sensors. The LWD module(s) 120 may include capabilities for measuring, processing, and storing information, as well as for communicating with surface equipment. By way of example, the LWD module(s) 120 may include one or more of a nuclear magnetic resonance (NMR) logging tool, a nuclear logging tool, a resistivity logging tool, an acoustic logging tool, or a dielectric logging tool, and so forth, and may include capabilities for measuring, processing, and storing information, and for communicating with the surface equipment (e.g., by suitably operating the electromagnetic signal transmitter 120A).

The MWD module 130 may also be housed in a drill collar, and may contain one or more devices for measuring characteristics of the drill string 112 and drill bit 105. In the present embodiment, the MWD module 130 may include one or more of the following types of measuring devices: a weight-on-bit measuring device, a torque measuring device, a vibration measuring device, a shock measuring device, a stick/slip measuring device, a direction measuring device, and an inclination measuring device (the latter two sometimes being referred to collectively as a "D&I package"). The MWD module 130 may further include an apparatus (not shown) for generating electrical power for the MWD module 130 and the LWD module(s) 120. For example, electrical power generated in the MWD module 130 may be used to power the MWD module 130 and the LWD module (s) 120. In the present example embodiment, the electrical power may be generated by a mud flow driven turbine generator (not shown) or may be stored in batteries (not shown) and may be used to operate the measurement devices in the respective modules 120, 130 and the electromagnetic signal transmitter 120A. Any of the LWD module(s) 120 and the MWD module 130 may include circuitry to drive the electromagnetic signal transmitter 120A to generate an encoded electromagnetic signal that includes any or all of the various sensor measurements made by the devices in the respective modules 120, 130. The electromagnetic signal transmitter 120A may be, for example and without limitation an insulating gap disposed between electrodes, wherein a time varying voltage corresponding to the electromagnetic transmitter signal to be generated is imparted across the electrodes. In other embodiments, the electromagnetic transmitter 120A may be a toroidal wire coil through which a time varying electrical current is passed. The amplitude of the time varying current may correspond to the electromagnetic transmitter signal that is to be generated. The wellbore 111 may include a casing 155 inserted, and in some embodiments cemented therein to a selected depth in the wellbore 111.

Figure 3A:
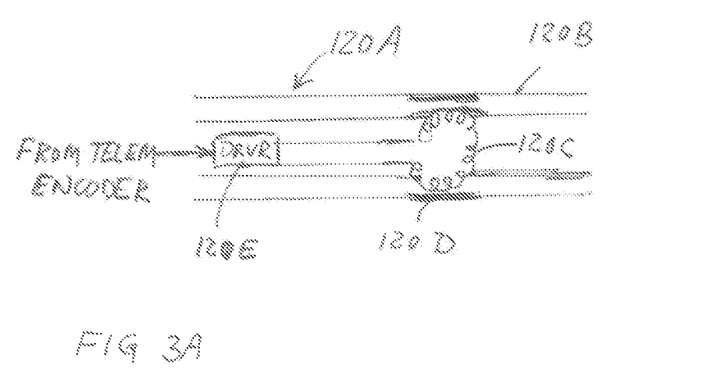
FIG. 3A shows one example embodiment of an electromagnetic signal transmitter.
Figure 3B:
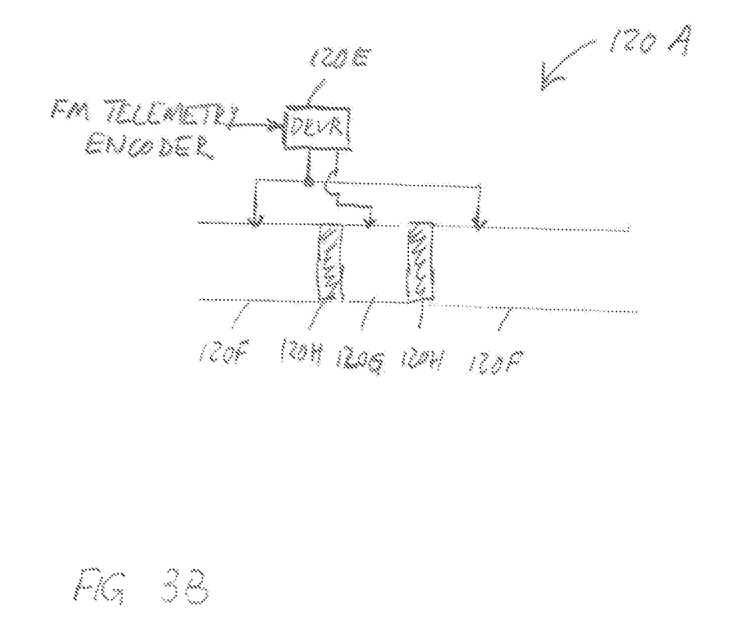
FIG. 3B shows another example embodiment of an electromagnetic signal transmitter.

The foregoing examples of an electromagnetic signal transmitter are shown in FIGS. 3A and 3B, respectively. In FIG. 3A, a transmitter driver 120E may be in signal communication at its input with a telemetry encoder (not shown separately) in either of the MWD module (130 in FIG. 3) or the LWD module (120 in FIG. 3). The transmitter driver 120E output may be coupled to a toroidal coil 120C disposed in a recess on the exterior of a drill collar 120B in which the functional components of the electromagnetic signal transmitter 120A may be disposed. The toroidal coil 120C may be covered on its exterior by a wear resistant shield 120D. FIG. 3B shows another example embodiment of the electromagnetic signal transmitter 120A, in which the transmitter driver 120E has its output electrically connected to first electrodes 120F electrically isolated by insulators 120H from a second electrode 120G. In the present example embodiment, a time varying voltage corresponding to the encoded electromagnetic telemetry signal may be imparted across the first 120F and second 120H electrodes. For both the foregoing embodiments, the time varying current or voltage induces an electromagnetic field in the formations surrounding the electromagnetic signal transmitter 120A, one or more components of which may be detected as will be further explained below.

Returning to FIG. 2, the detected electromagnetic telemetry signals may be processed in a surface recording and control system 152 located at the surface, in some embodiments proximate the platform and derrick assembly 110A. The surface recording and control system 152 may include one or more processor-based computing systems. In the present context, a processor or processor-based computing system may include a microprocessor, programmable logic devices (PLDs), field-gate programmable arrays (FPGAs), application-specific integrated circuits (ASICs), system-on-a-chip processors (SoCs), or any other suitable integrated circuit capable of executing encoded instructions stored, for example, on tangible computer-readable media (e.g., read-only memory, random access memory, a hard drive, optical disk, flash memory, etc.). Such instructions may correspond to, for example, workflows and the like for carrying out a drilling operation, algorithms and routines for processing data received at the surface from the BHA 100 (e.g., as part of an inversion to obtain one or more desired formation parameters), and the like. The surface recording and control system 152 may include circuitry (not shown separately in FIG. 2) for detecting and decoding signals induced in one or more dipole antennas as a result of the electromagnetic telemetry signals as will be further explained below.

Having shown example embodiments of a wellbore drilling and measuring system, including an electromagnetic telemetry signal transmitter forming part of a set of wellbore drilling and measuring instruments, example methods and apparatus for detecting the electromagnetic telemetry signal for decoding and processing thereof will now be explained with reference to FIGS. 4 through 7. The methods and apparatus to be described below may use electric dipole antennas. Voltages corresponding to amplitudes of electromagnetic fields may be induced in such antennas as is known in the art.

The voltage V induced on an electric dipole antenna by an electromagnetic field source far away (e.g., in the "far field" of the electromagnetic signal transmitter 120A in FIG. 2) wherein the dipole antenna is aligned radially with a drilling system (110A in FIG. 2) or wellbore casing (155 in FIG. 2), that is, disposed along a line extending radially outwardly therefrom, may be determined by the expression:

$$V = \frac{\omega\mu_0 P}{4\pi r^3}(1 - ikr)e^{-ikr} \qquad (1)$$

wherein $\omega$ represents the angular frequency of the field induced by the electromagnetic signal transmitter (120A in FIG. 2), $\mu_0$ represents the dielectric permittivity of free space, r represents the radial distance between the antenna poles (i.e., the length of the dipole) and P represents the electromagnetic signal transmitter electric field amplitude. e represents the natural logarithm base and i represents the imaginary number $\sqrt{-1}$ in the above equation.

An electric dipole noise source having a low frequency (e.g., less than 100 Hz) located near the dipole antenna may induce voltage in the dipole antenna that may be expressed as:

$$V_i^n = \overline{E}_n \cdot \overline{d}_i = \frac{i\mu_0 \omega_n I_n}{4\pi x^2}[(\hat{x}\times\overline{d}_n)\cdot(\hat{x}\times\overline{d}_i)], i = x, y \qquad (2)$$

where
$\overline{d}_n = a\cos(\alpha)\hat{x} + a\sin(\alpha)\hat{y}$
$\overline{d}_x = L\hat{x}$
$\overline{d}_y = L\hat{y}$ The induced noise voltage on each of two orthogonal, collocated electric dipole antennas Px, Py may be expressed as:

$$V_x = \frac{i\mu_0\omega_n I_n}{4\pi x^2}aL\sin(\alpha) \qquad (3)$$

$$V_y = \frac{i\mu_0\omega_n I_n}{4\pi x^2}aL\cos(\alpha)$$

In the above expressions, x and y are Cartesian coordinates of a coordinate system having the casing (155 in FIG. 2) as the origin (0, 0), $\hat{x}$ and $\hat{y}$ are unit vectors in the respective x and y coordinate axes, and L represents an arbitrary distance from the casing (155 in FIG. 2). $\alpha$ represents the angle subtended between the direction of the dipole antenna and the x axis, $\omega_n$ represents the angular frequency of the noise source and $I_n$ represents the current amplitude of the noise source. From the foregoing equations it is possible to form some conclusions about the electromagnetic telemetry signal and drilling system generated noise as will be explained in more detail below. Although the above expressions use Cartesian coordinates, it should be understood that any other coordinate system including, for example and without limitation polar coordinates may be used with equal effect and the coordinate system chosen is not intended to limit the scope of the present disclosure.

Figure 4:
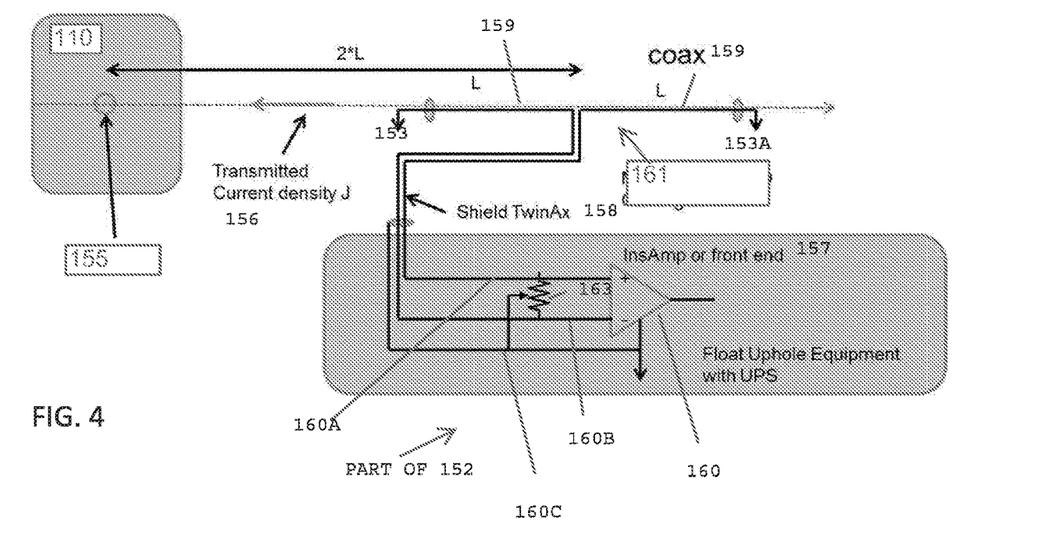
FIG. 4 shows an example embodiment of an electrode arrangement and connecting cables therefor.

FIG. 4 shows a schematic dipole antenna arrangement wherein the electromagnetic signal transmitter current density is shown at 156. A 160C shield of a "twinax" cable 158 (a cable including a twisted pair of insulated electrical conductors 160A and 160B disposed inside an electrically conductive shield 160C) may have one of the two conductors 160A thereof in the present example connected to a first coaxial cable 159 and thence connected to an electrode 153 of the dipole antenna 161 disposed nearest the drilling system 110A or casing 155 at a distance L from the drilling system 110A or casing 155. The other twinax cable 158 insulated, shielded electrical conductor 160B may be connected to another length of coaxial cable 159, the interior conductor of which may be connected to another ground electrode 153A disposed at a distance 3L from the drilling system 110A or casing 155. The twinax cable 158 may extend to a voltage measuring circuit forming part of the receiver electronics in the surface recording and control system (152 in FIG. 2). The radial direction of a line connecting the two electrodes 153, 153A may be selected to correspond to the direction of the current density 156. Such direction may be determined based on the orientation of the electromagnetic signal transmitter (120A in FIG. 2) in the wellbore (111 in FIG. 2). The receiver circuitry may have a balanced front end, composed of an instrumentation amplifier or differential amplifier. In the present example embodiment, a normal input (+) to the amplifier 160 may be electrically connected to one electrode 153A, and an inverting input (−) thereof may be electrically connected to the other electrode 153 of the dipole antenna 161. The twinax cable 158 shield 160C may be connected to a center tap resistor or transformer tap 163 the end terminals of which may be connected between the normal (+) and inverting (−) inputs to the amplifier 160. The foregoing example balanced front end configuration may be expected to substantially cancel any stray capacitance in the twinax cable 158 and the coaxial cables 159 and may maximize common mode rejection to the input of the amplifier 160. The foregoing cable configuration between the amplifier and the electrodes 153, 153A may be expected to provide an observable decrease in electrical noise originating from the drilling system 110A. In other embodiments, the electrodes 153, 153A of the dipole antenna 161 may each be connected to the respective inputs (+), (−) of the amplifier 160 using the interior conductor of a separate coaxial cable 159 extending from each amplifier input to each electrode 153, 153A. Both coaxial cable shields may be connected to the center tap as shown in FIG. 4.

Figure 5:
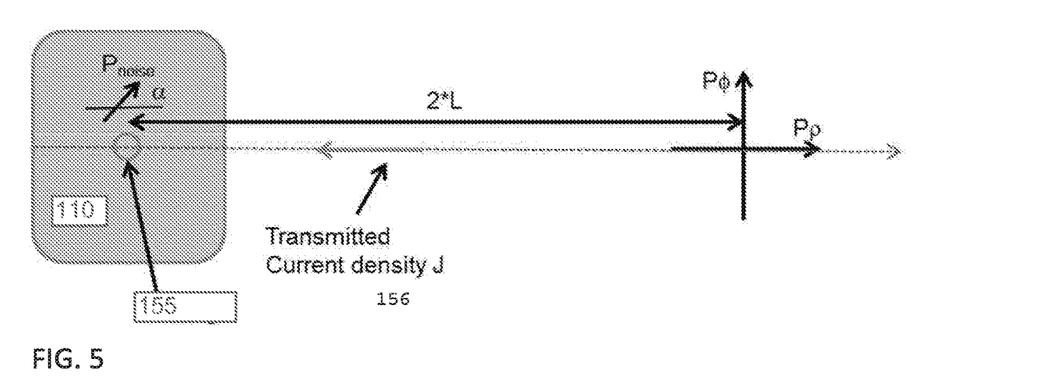
FIG. 5 shows an example of crossed electric dipole antennas that may be used in some embodiments.

Referring to FIG. 5, a further reduction in electrical noise induced by the drilling system 110A, shown as an arrow indicating an electric dipole $P_{noise}$ in the figure, may be obtained using the assumption that the electric field (or current density) of the electromagnetic telemetry signal is oriented radially outwardly, i.e., along the ρ direction as shown at 156, from the casing 155 and that the magnetic field thereof is in the o-direction, transverse to the electric field direction ρ. It may be assumed the electromagnetic telemetry signal is predominantly received on the electric dipole antenna $P_\rho$ extending in the ρ direction and noise induced by the drilling system 110A may be an electric dipole randomly oriented at an angle α with respect to the telemetry signal electric dipole direction ρ. A second electric dipole antenna, shown as $P_\varnothing$ may be oriented substantially perpendicularly to the electric dipole antenna, shown as Pρ and predominantly detect only the electrical noise generated by the drilling system 110A, because the second dipole antenna is substantially insensitive to the electric field of the electromagnetic telemetry signal. Then the difference between the voltage in antenna Pρ and that induced in antenna $P_\varnothing$ is less sensitive to noise as shown in the voltage equation below:

$$V = V_\rho - V_\varphi, \quad (4)$$

The induced voltages on each of the orthogonal dipole antennas $P_\rho$, $P_\varnothing$ may be represented by the expressions:

$$V_\rho = V_{signal} + V_{noise} \cos(\alpha)$$

$$V_\varphi \approx V_{noise} \sin(\alpha), \quad (5)$$

where α is the angle between the radial direction of the Pρ antenna and the unknown direction of the noise electric dipole $P_{noise}$. A difference signal as expressed in Eq. (4) may be obtained, for example, by electrical connection of the Pρ dipole antenna to a normal input (+) of an operational amplifier (see FIG. 4) and electrical connection of the orthogonal dipole antenna Pρ to the inverting input (−) thereof.

$$V = V_{signal} + V_{noise}(\cos(\alpha) - \sin(\alpha)) \quad (6)$$

It is within the scope of the present disclosure to place the above described crossed dipoles around the drilling system 110A at such a position and orientation that the difference between the sine and cosine terms are nearly zero, that is at α of 45° and 225° so as to reduce drilling system induced noise. If the noise amplitude is relatively large compared to the electromagnetic telemetry signal amplitude, then it is possible to use the ratio $V_\varphi/V_\rho = V \tan(\alpha)$ to solve for α. The dipole antennas $P_\rho$, $P_\varnothing$ may then be moved about the drilling system 110A to a new crossed-dipole antenna orientation.

$$\alpha \square \tan^{-1}(V_\varphi/V_\rho) \quad (7)$$

Figure 6:
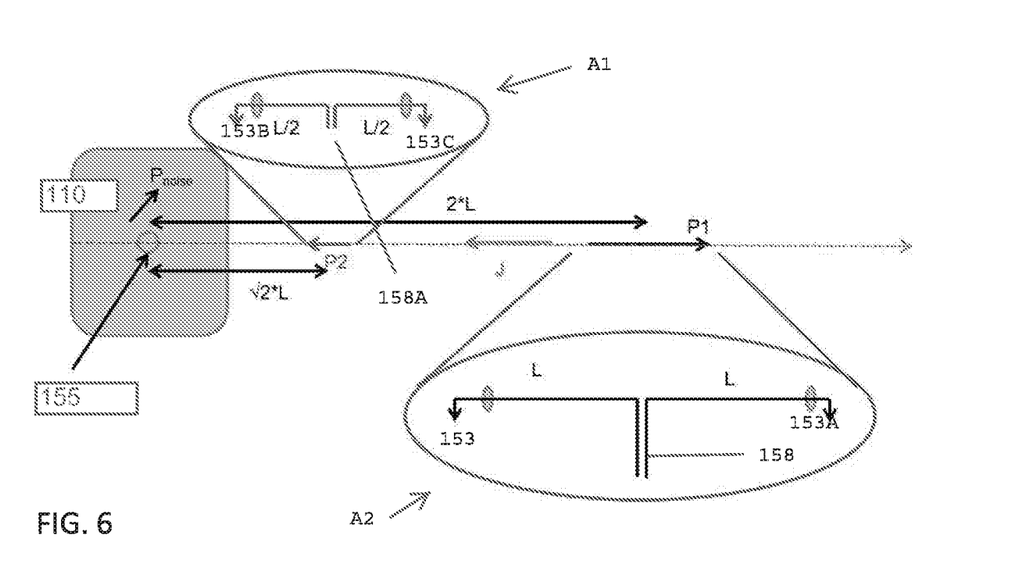
FIG. 6 shows another example arrangement of electrodes and connecting cables.

Another method to reduce noise is to observe that the near-field noise is strongly radial distance sensitive, while the far-field electromagnetic telemetry signal is relatively constant with respect to radial distance from the casing 155. Therefore, constructing two antennas A1, A2 that are antiparallel, where one antenna A1 is half the length (L) of the other antenna A2 (length 2L) and centered, respectively at distances of √2(L) and 2(L) from the casing 155 as shown in FIG. 6 may enable further noise reduction. When the difference between the voltages induced in each of the foregoing two antennas is measured, the noise amplitude is reduced to near zero, while the electromagnetic telemetry signal amplitude is only halved. The foregoing relies on the near field and far field properties of the respective electromagnetic field sources:

$$V = V_{\rho 1} - V_{\rho 2}, \quad (8)$$

where $$V_{\rho 1}(x_1) \approx V_{signal} + V_{noise}(x_1) \quad (9)$$

$$V_{\rho 2}(x_2) = \frac{V_{signal}}{2} + V_{noise}(x_2).$$

The difference between voltages induced in the respective antennas A1, A2 is substantially equal to zero:

$$V_{noise}(x_1) - V_{noise}(x_2) = 0 \quad (10)$$

that is, when the conditions below are met for each antenna A1, A2:

$$\frac{i\mu_0\omega_n I_n}{4\pi x_1^2}aL_1\cos(\alpha) = \frac{i\mu_0\omega_n I_n}{4\pi x_2^2}aL_2\cos(\alpha) \quad (11)$$

$$\frac{L_1}{x_1^2} = \frac{L_2}{x_2^2}, \quad L_2 = \frac{L_1}{2}$$

$$\frac{1}{x_1^2} = \frac{1}{2x_2^2}, \quad x_i = 2L$$

$$x_2 = \sqrt{2}\,L$$

the difference between the induced voltages in the two antennas may be expressed as:

$$V = \frac{V_{signal}}{2} \quad (12)$$

Some experimentation to find the radial distance 2L for the full length antenna A2 may be required to effectively cancel the noise by determining the difference between the voltages induced in the two antennas A1, A2.

Figure 7:
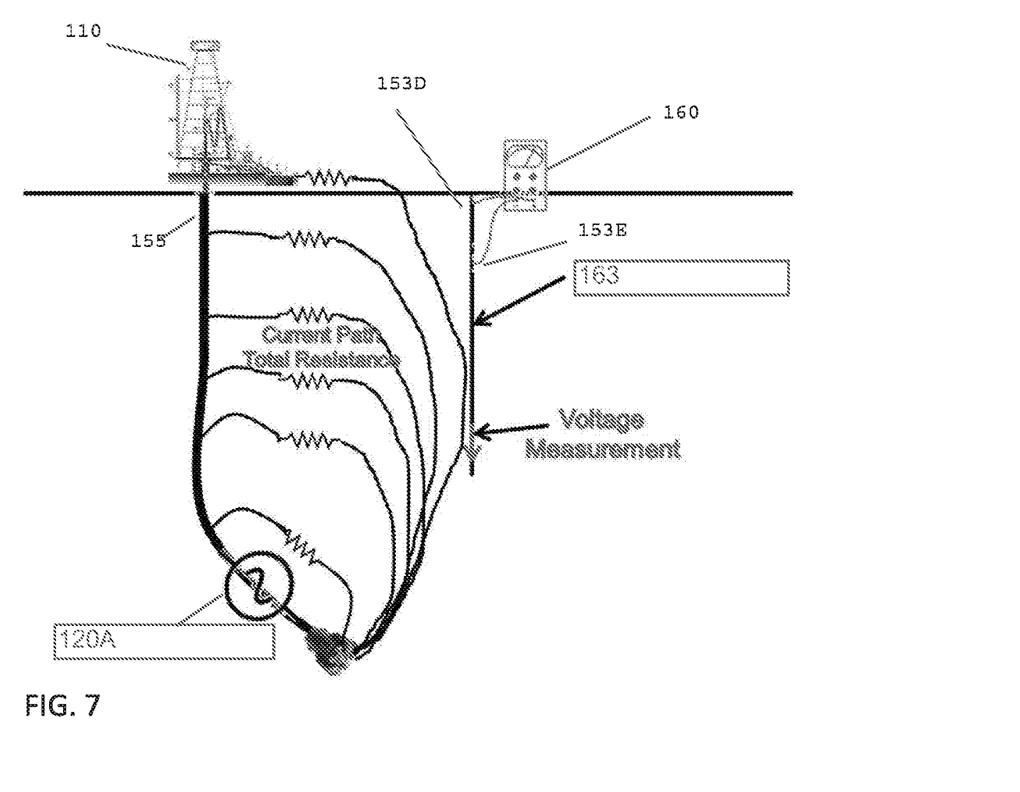
FIG. 7 shows an example dipole antenna disposed in a monitor wellbore.

In another embodiment as shown in FIG. 7, one or more electric diploe antennas 163 maybe inserted into a wellbore having electrically non-conductive casing therein, where at the bottom a distance of at least L is open (uncased). A twinax cable (FIG. 4) or two coaxial cables may connect to the input of a voltage measuring circuit 160, or as shown in FIG. 4, to each of two electrodes 153D, 153E separated by a distance of L. The present example embodiment may increase the amplitude of the detected telemetry signal and reduce the amplitude of detected drilling system noise.

Although the preceding description has been described herein with reference to particular means, materials and embodiments, it is not intended to be limited to the particulars disclosed herein; rather, it extends to all functionally equivalent structures, methods and uses, such as are within the scope of the appended claims.

What is claimed is:

1. An apparatus for detecting an electromagnetic signal originating in a wellbore, comprising:
   at least one electric dipole antenna comprising first and second electrodes spaced apart by a first distance along a radial direction from the wellbore and having a midpoint therebetween spaced from the wellbore by a second distance along the radial direction, a dipole moment of the at least one electric dipole antenna being substantially aligned with an electric field direction of the electromagnetic signal;
   a shielded electrical cable connecting an amplifier in a voltage measuring circuit to the first and second electrodes, the shielded electrical cable including a twisted pair of first and second insulated electrical conductors deployed in an electrically conductive shield, the first and second insulated electrical conductors connected to center conductors of corresponding first and second coaxial cables at the midpoint, the first and second coaxial cables running along the radial direction between the midpoint and the corresponding first and second electrodes, the center conductors of the first and second coaxial cables connected to the first and second electrodes;
   and
   a surface recording and control system configured to receive an output signal from the amplifier.

2. The apparatus of claim 1, wherein the electrically conductive shield is connected to:
   a center tap of a resistor or a transformer bridging inputs to a signal amplifier and wherein the configuration between the amplifier and the electrodes results in an observable decrease in electrical noise.

3. The apparatus of claim 1 wherein the amplifier comprises a differential amplifier.

4. The apparatus of claim 1, wherein the first and second distances are equal to one another.

5. An apparatus for detecting an electromagnetic signal originating in a wellbore, comprising:
   a first electric dipole antenna comprising a pair of electrodes spaced apart by a distance 2(L) and having a first midpoint that is spaced a distance 2(L) from a casing included in the wellbore;
   a second electric dipole antenna comprising a pair electrodes spaced apart by a distance L and having a second midpoint that is spaced a distance √2(L) from the casing included in the wellbore;
   the first and second antennas are anti-parallel to one another;
   a voltage measuring circuit connected to an input of the first electric dipole antenna and an input of the second electric dipole antenna; and
   a surface recording and control system which receives voltages induced in the first and second electric dipole antennas measured by the measuring circuit and processes the voltages induced in each of the first and second electric dipole antennas.

6. The apparatus of claim 5, further comprising processing the voltages induced in the first and second antennas according to the formula $$V = V_{p1} - V_{p2}$$

where V is a difference between the voltage $V_{p1}$ in the first antenna and the voltage $V_{p2}$ in the second antenna.

7. The apparatus of claim 5, wherein a shielded electrical cable connects the first electric dipole antenna to the voltage measuring circuit.

8. The apparatus of claim 5, wherein the voltage measuring circuit comprises an amplifier and the apparatus further comprises a shielded electrical cable connecting the amplifier to the pair of electrodes in the first electric dipole antenna, the shielded electrical cable including a twisted pair of first and second insulated electrical conductors deployed in an electrically conductive shield, the first and second insulated electrical conductors connected to center conductors of corresponding first and second coaxial cables at the first midpoint, the first and second coaxial cables running along a radial direction between the first midpoint and corresponding first and second electrodes in the pair of electrodes of the first electric dipole antenna, the center conductors of the first and second coaxial cables connected to the first and second electrodes of the first electric dipole antenna.

9. An apparatus for detecting an electromagnetic signal originating in a wellbore, comprising:
   a first electric dipole antenna Pp comprising a pair of electrodes spaced apart by a first distance and spaced from a surface of the wellbore by a second distance, the first electric dipole antenna being oriented in a direction of the electromagnetic signal;

a second electric dipole antenna Po comprising a pair of electrodes spaced apart by the first distance and having a common point with and being orthogonal to the first electric dipole antenna;

a voltage measuring circuit connected to the first and second electric dipole antennas; and a surface recording and control system which receives voltages induced in each of the first and second electric dipole antennas and processes the voltages according to the formula:

$$V = V_\rho - V_\varphi$$

where V is a difference between the voltage $V_\rho$ in antenna $P_\rho$ and the voltage $V_\varphi$ in antenna $P_\varnothing$.

10. The apparatus of claim 9, wherein the first electric dipole antenna is oriented in a direction that is selected such that it makes an angle α of about 45 degrees with a dipole noise source located at the wellbore.

11. The apparatus of claim 9, wherein a shielded electrical cable connects the first electric dipole antenna to the voltage measuring circuit.

12. The apparatus of claim 9, wherein the voltage measuring circuit comprises an amplifier and the apparatus further comprises a shielded electrical cable connecting the amplifier to the pair of electrodes in the first electric dipole antenna, the shielded electrical cable including a twisted pair of first and second insulated electrical conductors deployed in an electrically conductive shield, the first and second insulated electrical conductors connected to center conductors of corresponding first and second coaxial cables at a midpoint between the pair of electrodes of the first electric dipole antenna, the first and second coaxial cables running along a radial direction between the midpoint and corresponding first and second electrodes in the pair of electrodes of the first electric dipole antenna, the center conductors of the first and second coaxial cables connected to the first and second electrodes of the first electric dipole antenna.

\* \* \* \* \*